Aug. 11, 1959 — C. J. KINSEY ET AL — 2,898,764
BALANCING MACHINE
Filed Nov. 30, 1955 — 11 Sheets-Sheet 1

INVENTORS
Claude J. Kinsey, &
BY John H. Varterasian
L. D. Burch
ATTORNEY

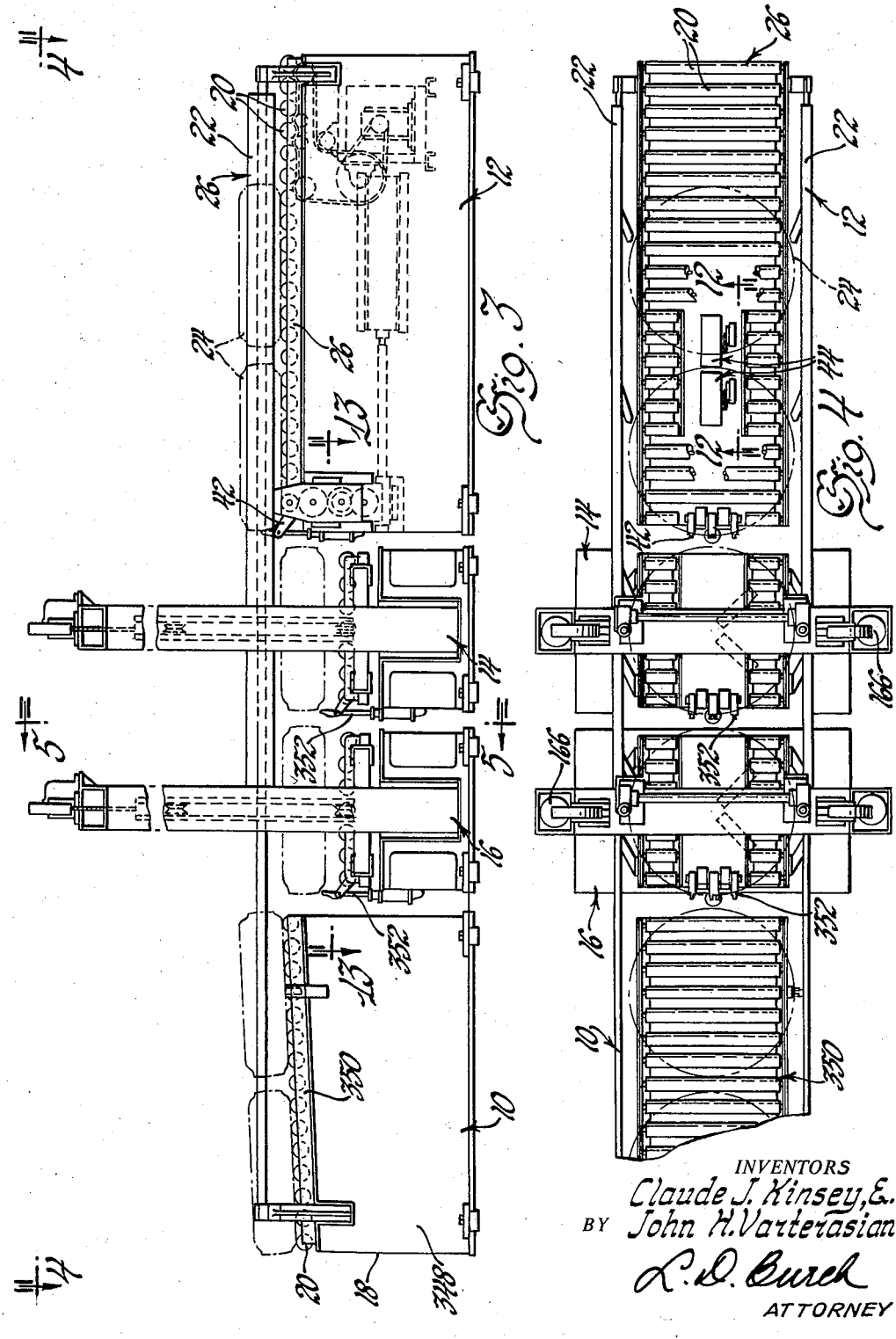

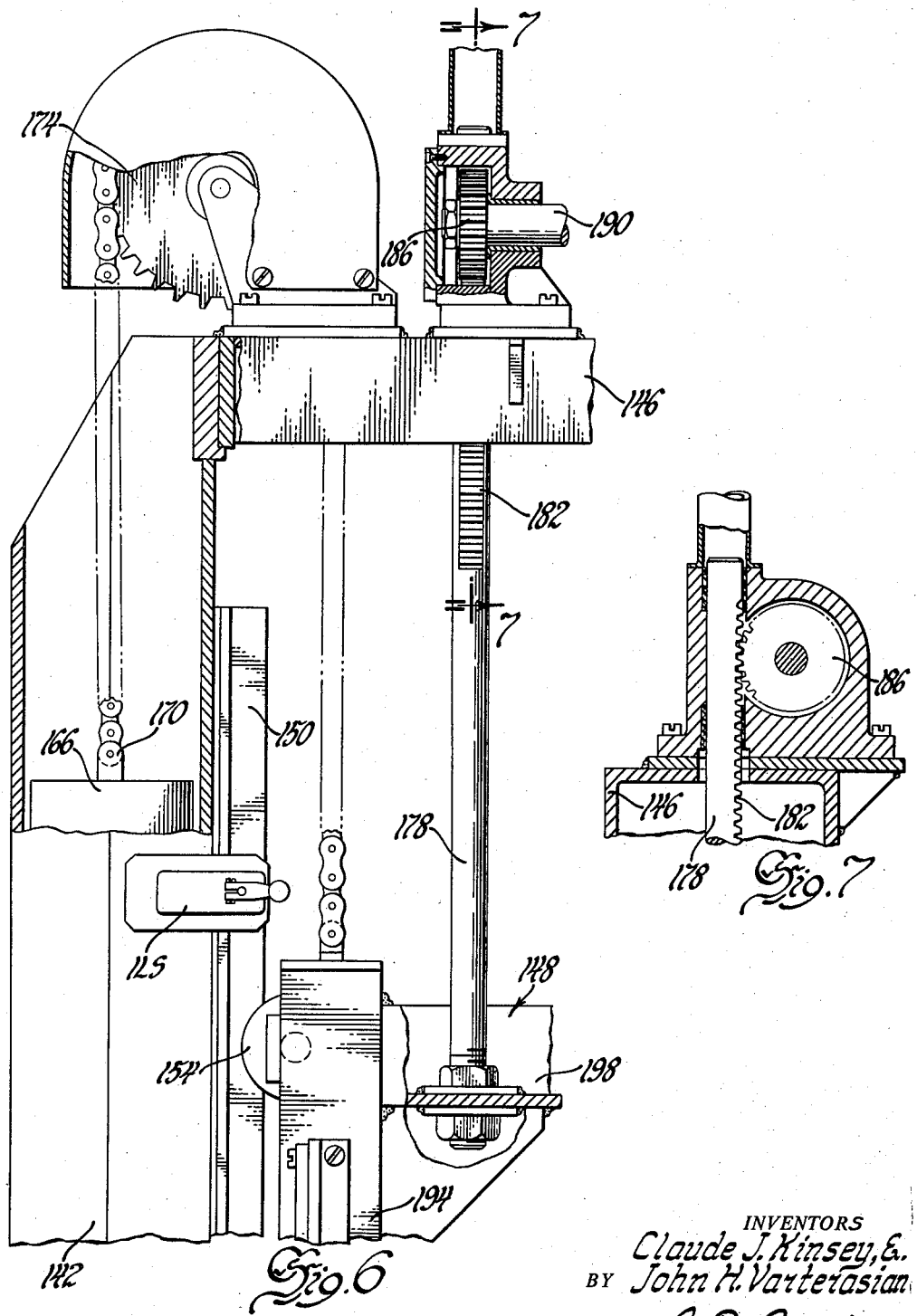

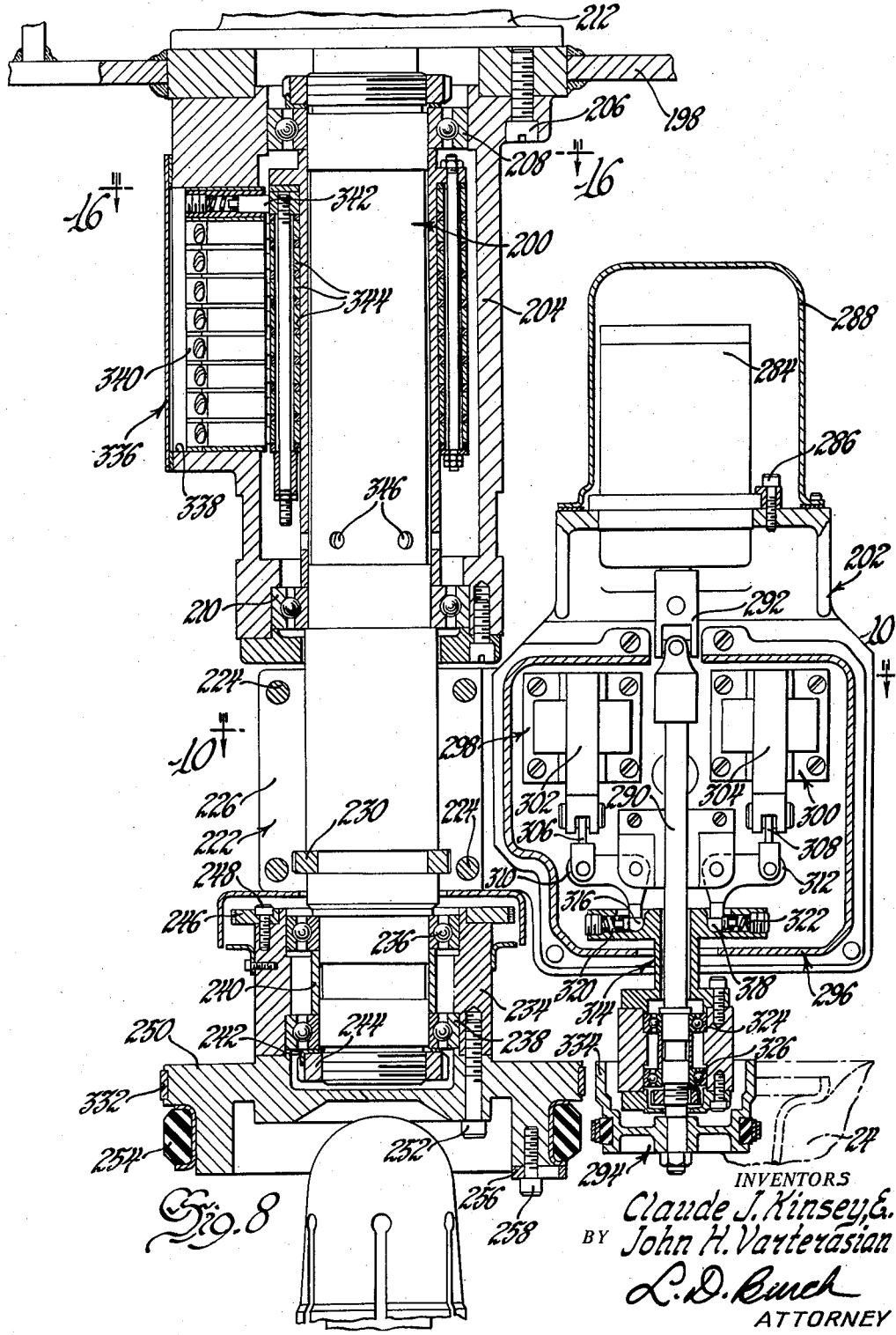

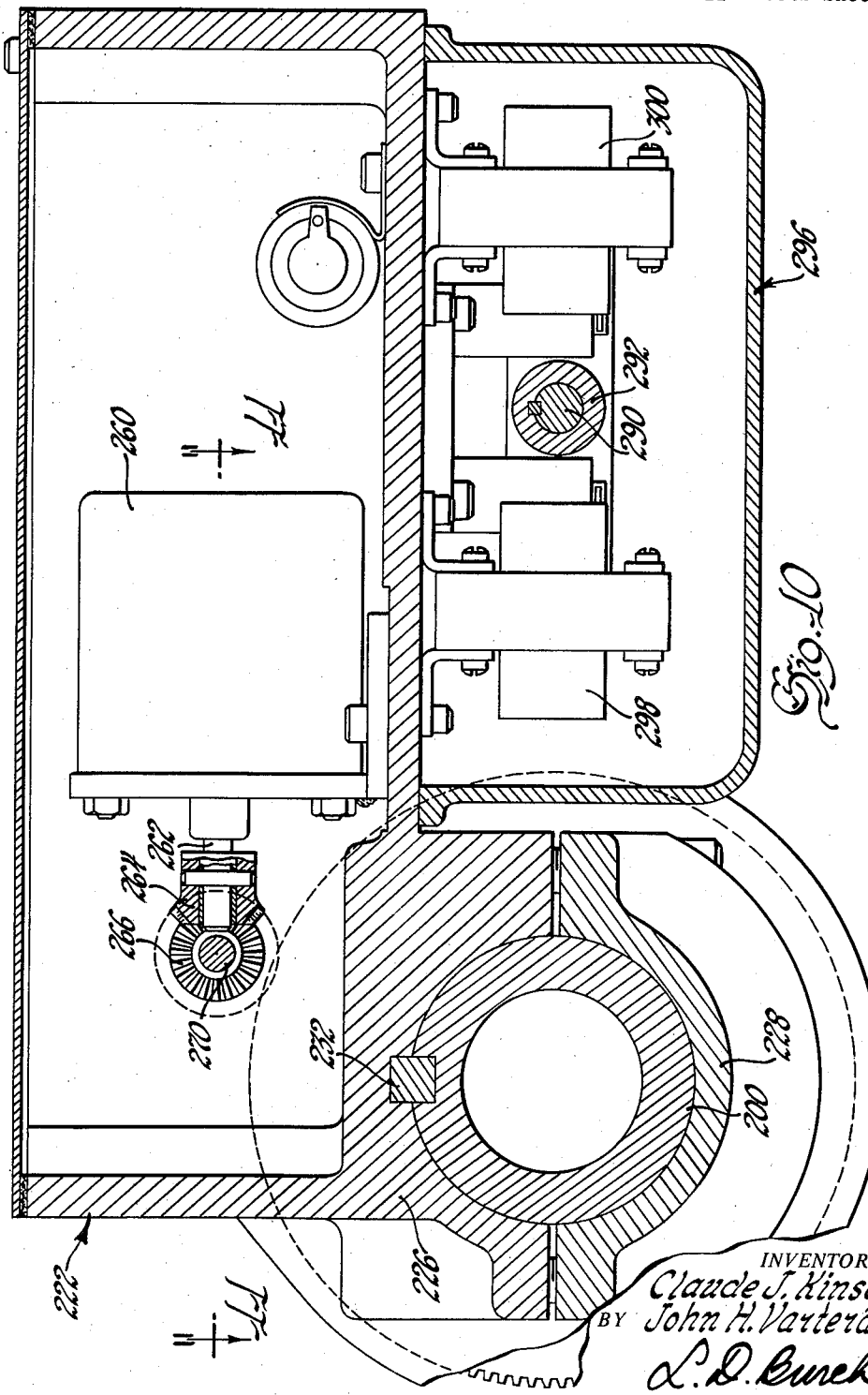

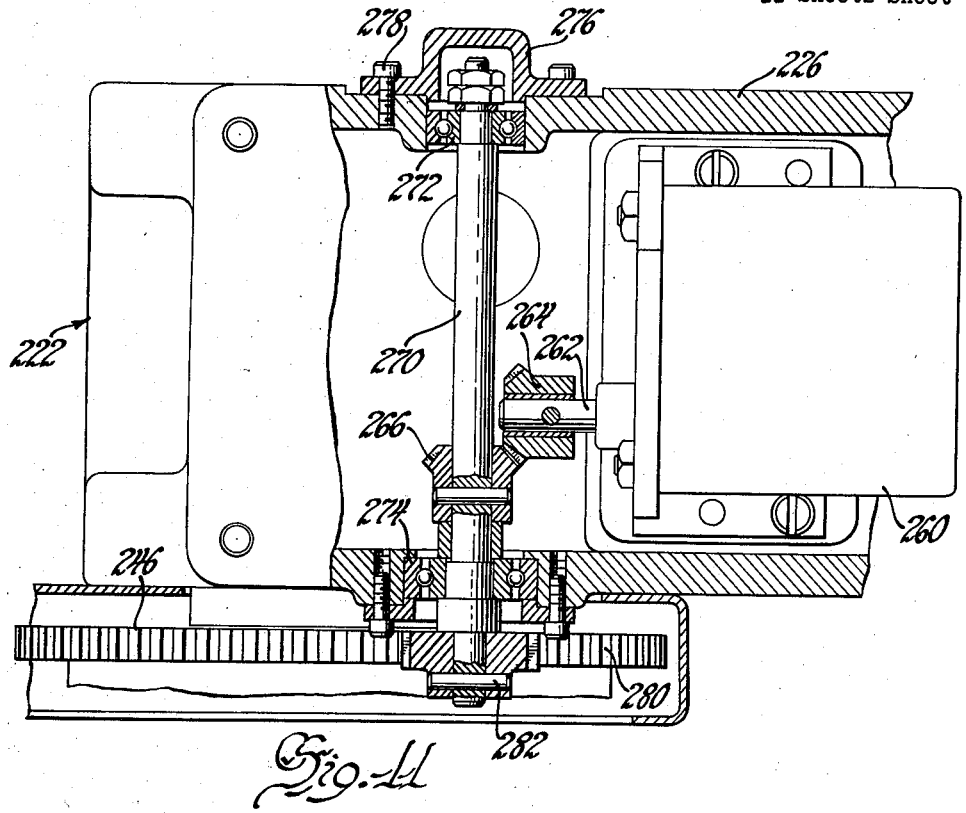
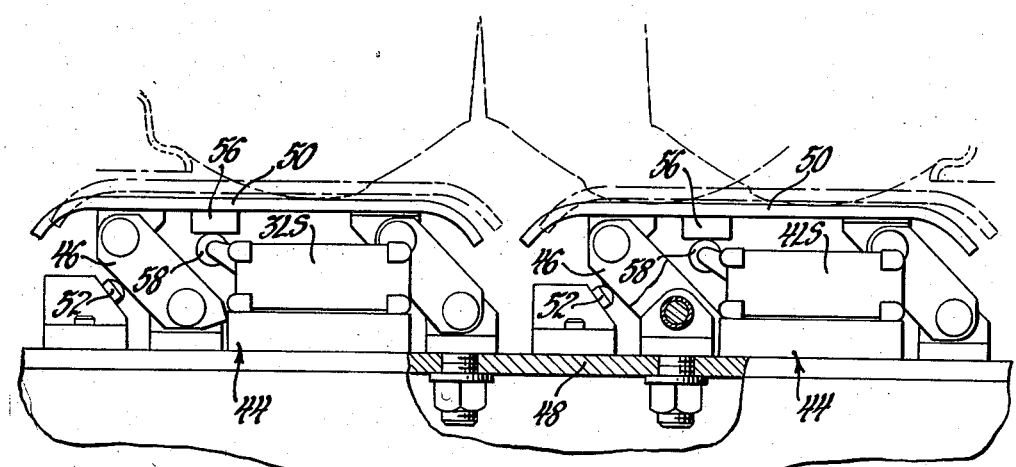

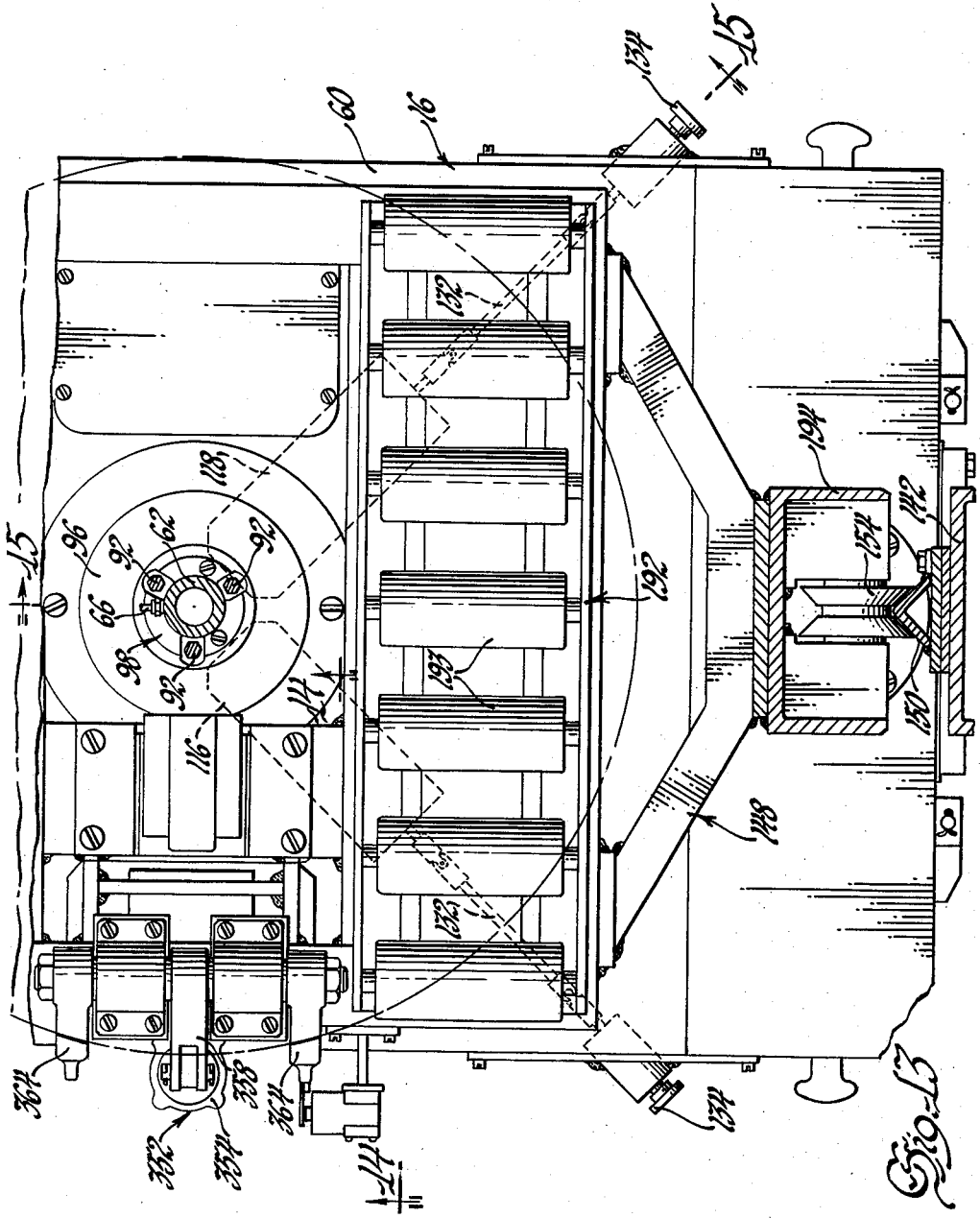

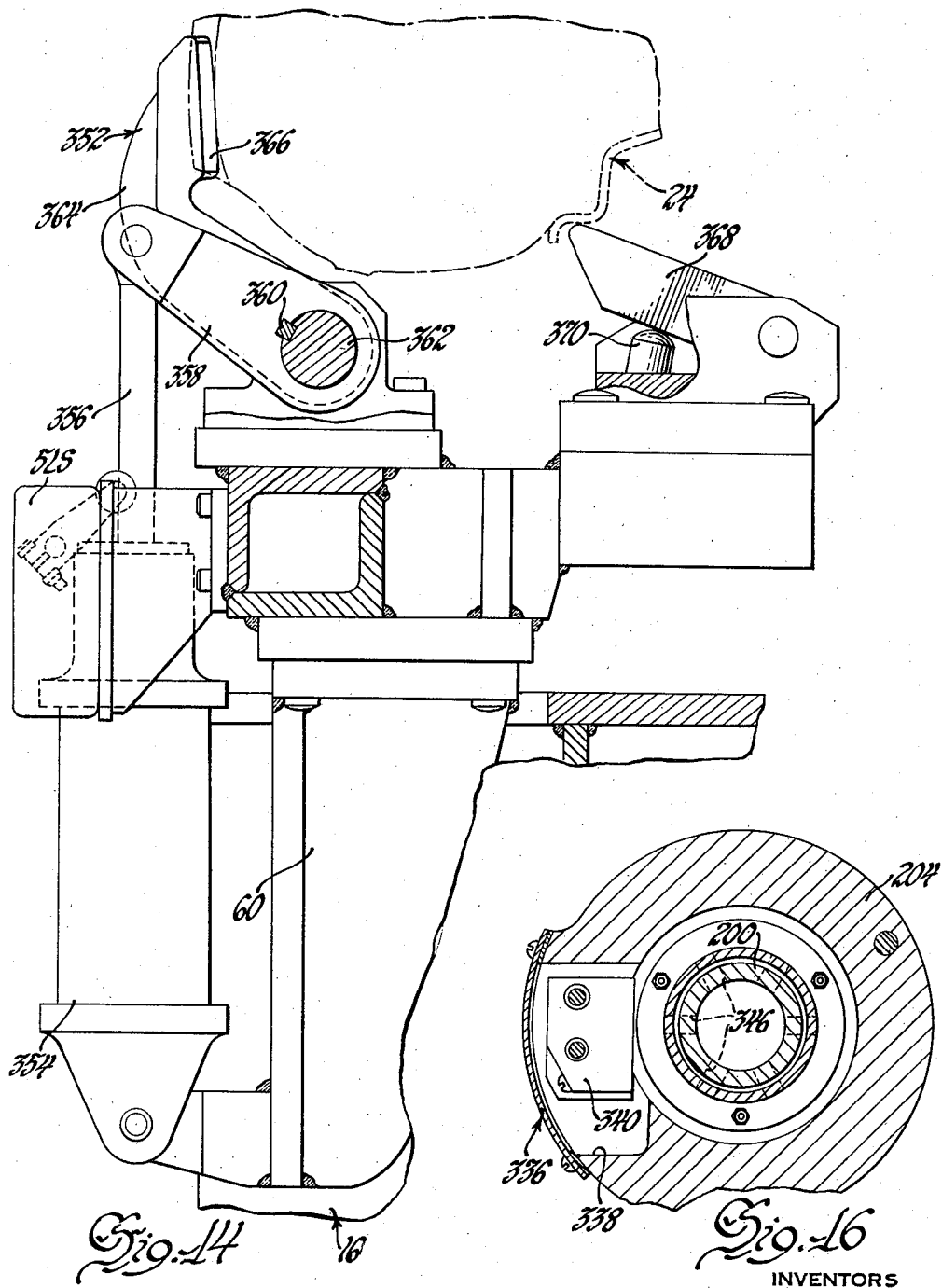

INVENTORS
Claude J. Kinsey, &.
John H. Varterasian
BY L. D. Burch
ATTORNEY

United States Patent Office 2,898,764
Patented Aug. 11, 1959

2,898,764

BALANCING MACHINE

Claude J. Kinsey and John H. Varterasian, Detroit, Mich., assignors to General Motors Corporation, Detroit, Mich., a corporation of Delaware Application November 30, 1955, Serial No. 550,151

11 Claims. (Cl. 73—483)

This invention relates to balancing machines generally and more particularly to means within such machines for inspecting work members and marking the unbalanced character thereof on such members.

Numerous types of balancing machines have been used and proposed in the past for inspecting work members for balance characteristics. Each improvement over previous balancing machines has sought to reduce the time necessary to make balance computations and to increase the accuracy obtained thereby. In the automotive field the use of mass production methods and the increasingly high speeds at which rotating members used in automotive vehicles are subjected to has necessitated that a balancing machine be devised which includes still greater accuracies and which will perform in much less time than previously known balancing machines.

Accordingly, it is here proposed to provide a fully automatic balancing machine for receiving, transferring, loading, inspecting, marking, and unloading work members progressively and in a minimum of time as they pass therethrough. It is proposed to provide work supporting means for floating the work members in tiltable friction-free relation upon a film of air and to provide balance determinative means responsive to the tiltable position assumed by the work members. Means are also provided for marking the unbalance characteristics of each work member inspected on the work member at the position requiring correction. The marking means is operatively connected to the balance determinative means and the work loading means and is disposed in operative relation to the work member as disposed upon the work supporting means. Means are provided for having the marker means self-sustaining and such as require little attention.

The balancing machine proposed may be operated for individual work member inspection or for mass work inspection and in the latter respect, is fully automatic requiring limited attention only from a single operator. The proposed machine includes self-checking features whereby failures are readily located and remedied despite the somewhat complicated nature of the over-all installation and thereby is considered to be a more practical and economical installation than previously proposed balancing means of a similar nature.

In the drawings:

Figure 3 is a side elevational view of the machine of Figure 1 showing the relationship of work stations and a suitable workpiece transfer or conveyor means.

Figure 4 is a top view of the machine of Figure 3 taken in the plane of line 4—4 and looking in the direction of the arrows thereon.

Figure 6 is an enlarged view of a part of the work station shown by Figure 5 having parts broken away for clearer illustration.

Figure 7 is a cross-sectional view of a detailed part of the work station shown by Figures 5 and 6 as taken in the plane of line 7—7 of Figure 6 looking in the direction of the arrows thereon.

Figure 8 is an enlarged cross-sectioned view of the workpiece marker and marker repositioning means shown generally in Figure 5.

Figure 10 is an enlarged cross-sectional view of the marker and marker positioning means of Figure 8 taken in the plane of line 10—10 and viewed in the direction of the arrows thereon.

Figure 11 is a back side view of the marker positioning means having parts broken away and shown in cross-section as taken in the plane of line 11—11 of Figure 10 looking in the direction of the arrows thereon.

Figure 12 is an enlarged view of the transfer ready indicating means as shown in Figure 4 in the plane of line 12—12 and looking in the direction of the arrows thereon.

Figure 13 is a top view of one of the work station tables as viewed in the plane of line 13—13 of Figure 3 looking in the direction of the arrows thereon.

Figure 14 is an enlarged view of one of the workpiece positioning stops as taken in the plane of line 14—14 of Figure 13 looking in the direction of the arrows thereon.

Figure 16 is a cross-sectional view of the marker support and positioning spindle as taken in the plane of line 16—16 of Figure 8 looking in the direction of the arrows thereon.

Figure 1:
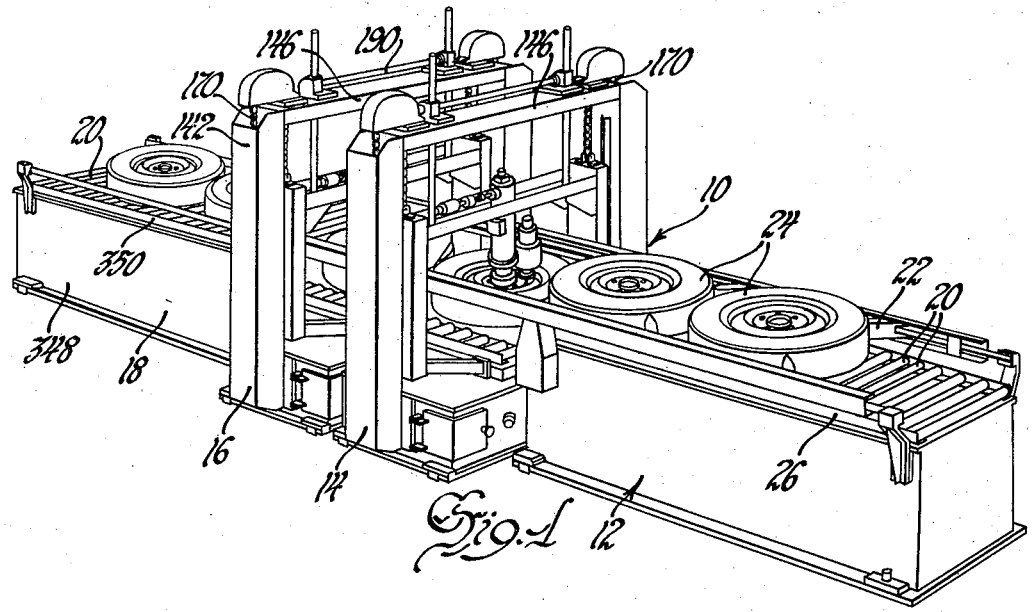
Figure 1 is a schematic illustration of a wheel and tire balancing machine embodying the principles of the present invention.

The present embodiment of this invention, shown by the drawings, and particularly Figures 1, 3 and 4, comprises a machine 10 including a loading device or station 12, a pair of balancing devices or stations 14 and 16, and an unloading device or station 18. Each work station includes a workpiece receiving platform or table of roller members 20 upon which workpieces may be more easily moved from one work station to another. The machine also includes work transfer means 22, here of the commonly known reciprocating shuttle bar type, for moving workpieces 24 from one station to the next adjacent station. The work members 24 in the illustrated embodiment of this invention are wheel and tire assemblies for vehicle use.

Figure 2:
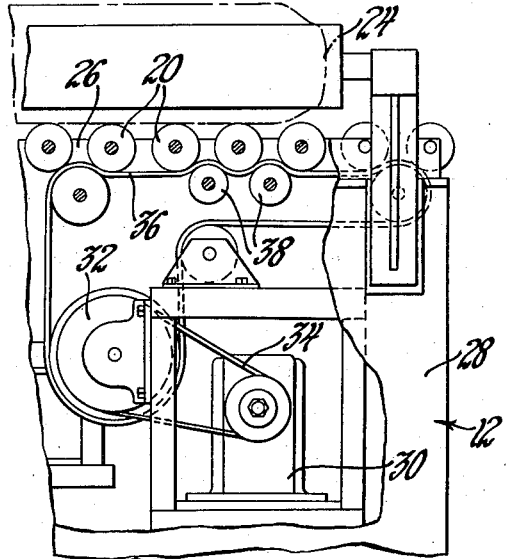
Figure 2 is a fragmentary section of the loading end of the machine of Figure 1 having parts broken away to more clearly show a means of work member loading.

The loading station 12, as shown by Figure 2, comprises a work receiving or loading table 26 including a plurality of roller members 20 upon which a pair of workpieces 24 may be simultaneously disposed. Within the base 28 of the loading station 12 is provided a motor 30 for driving a pulley 32 through belt means 34, which pulley, in turn, is adapted to cause rotation of the first few roller members 20 of the loading table by means of a friction belt 36 biased against such roller members by belt guide members 38. The power driven roller members are adapted to move the workpieces 24 towards the end of the loading station where the foremost work member is engaged by a stop or positioning means 42, shown in greater detail in Figure 14 and which will be described in greater detail later.

When a pair of workpieces 24 are received upon the loading platform 26, with the foremost work member engaging the stop means 42, they are each disposed over transfer ready switch means 44, reference particularly to Figures 4 and 12. These switches each comprise a parallelogram linkage including link members 46 pivotally connected to the loading station frame 48 and to a horizontal shoe 50. The work engaging shoe 50 is biased to a raised position by a spring loaded detent 52 engaging one of the link members. A limit switch 3LS and 4LS is disposed beneath each horizontal shoe 50 and is adapted to be activated when a work member is disposed upon the shoe of a weight sufficient to lower the shoe against the action of the spring biased detent 52 and cause a lug 56, provided on the shoe, to engage the switch control means 58.

When a pair of workpieces are disposed on the loading station table 26, so that both transfer ready switches 44 are activated, the workpieces are then ready to be transferred to the balancing stations 14 and 16.

Since the balancing stations 14 and 16 are substantially the same, reference will be made to only one such station in describing their structure.

Figure 5:
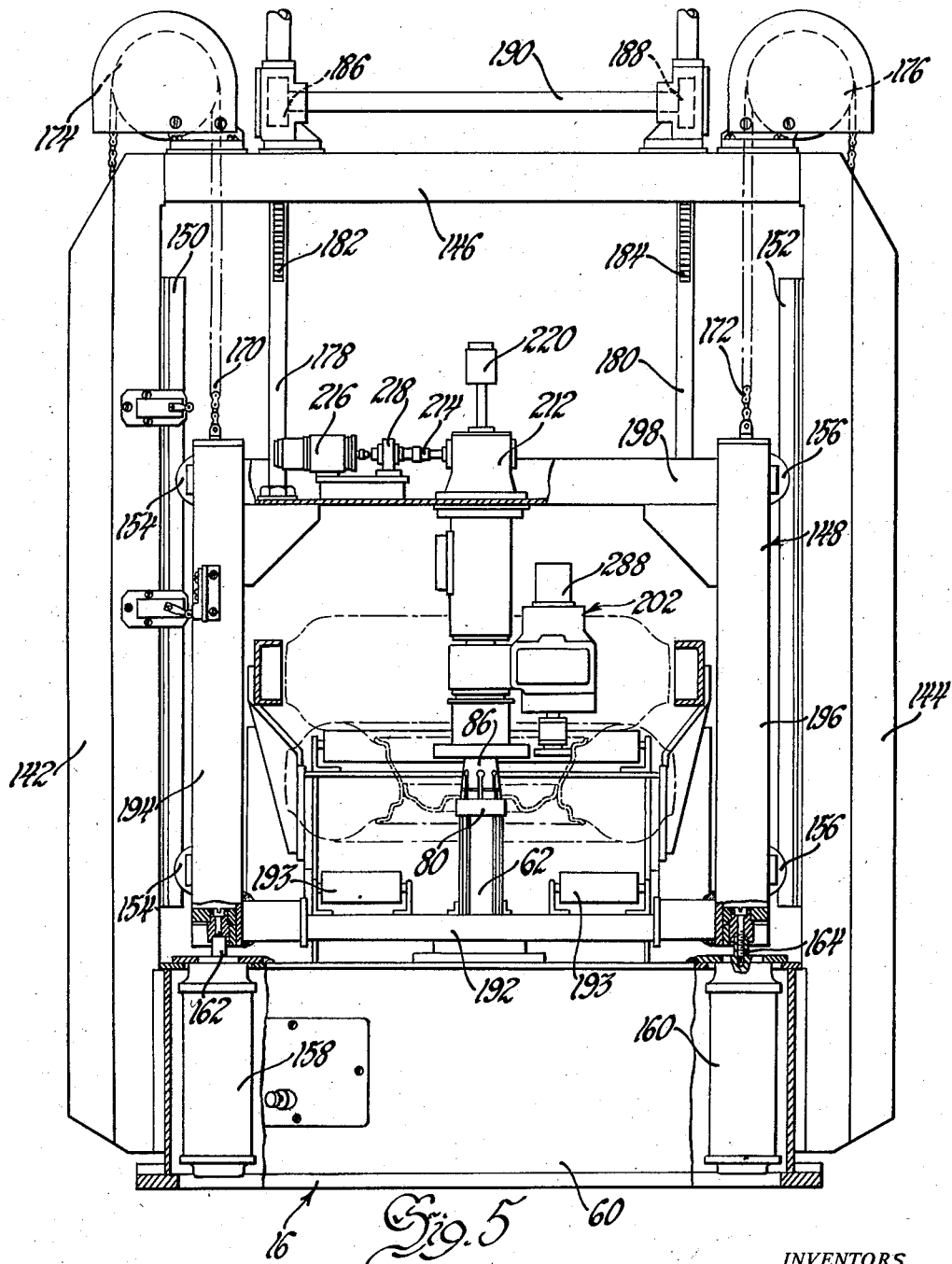
Figure 5 is an end view of one of the work stations of the machine of Figure 3 taken in the plane of line 5—5 viewed in the direction of the arrows thereon and having parts broken away for clearer illustration.
Figure 15:
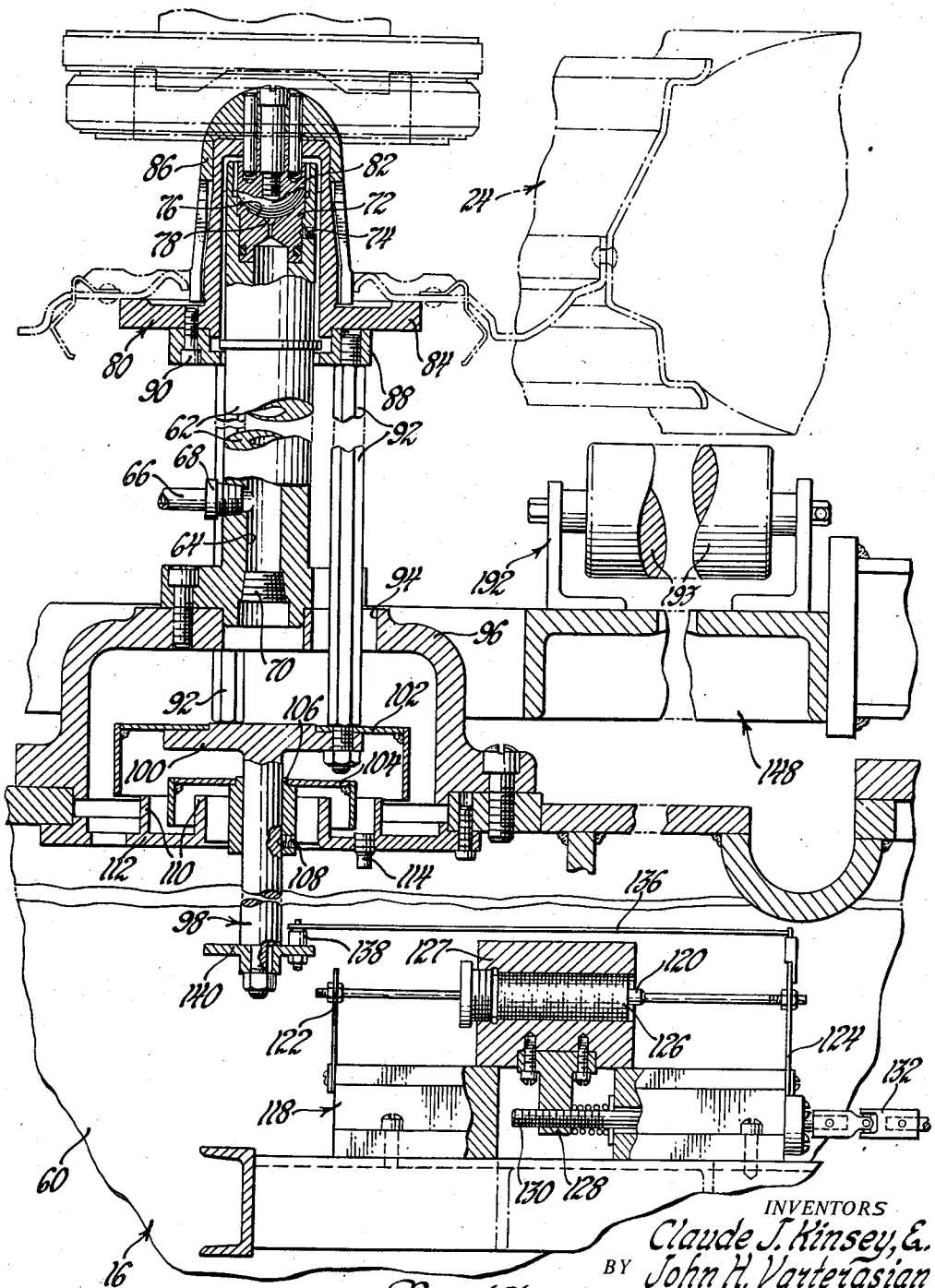
Figure 15 is a cross-sectional view of the workpiece support means and unbalance detection means as taken substantially in the plane of line 15—15 of Figure 13 looking in the direction of the arrows thereon.

Referring generally to Figure 5, and more particularly to Figure 15, each balance station includes a base member 60 having a vertically disposed workpiece support spindle 62 secured thereto. A passage 64 is formed through the spindle 62 and is connected to a compressed air line 66 by means of an adaptor 68 threaded through the spindle side wall. The lower end of spindle passage 64 is closed by a drain plug 70 threaded therein. The upper end of the spindle 62 is bored out to receive a ball seat member 72, retained therein by set screw means 74. The ball seat member 72 includes a spherical recess 76 and a passage 78 communicating with the spindle passage 64.

A workpiece receiving member 80 is disposed upon the support spindle 62 and includes a spherical shaped ball member 82 secured thereto and adapted to be received within the ball seat member 72. The workpiece receiving member 80 is disposed over the end of the support spindle 62, extending down around the spindle in shielding relation, and includes a flange 84 adapted to receive the workpiece 24; in this instance the wheel disc of the wheel and tire workpiece assembly. A work centering adaptor 86 is secured to the workpiece receiving member 80 to align the work member with the spindle axis.

An annular plate 88 is secured to the underside of the flange 84, as by fastening means 90, and has depending tie rods 92 threaded therein and extended downwardly through openings 94 provided in the spindle base member 96. The tie rods 92 support a follower member 98 disposed within the spindle base member 96, and are secured to the flanged end 100 thereof. The follower member 98 is adapted to assume the tiltable disposition of the work receiving member 80 and when there is no unbalance in the work member under observation is axially aligned with the spindle 62. A pair of inverted cup-shaped members 102 and 104 are secured to the follower 98; the one to the flanged end 100 and the other to a sleeve member 106, itself secured by set screw means 108 to the follower. The member 102 is adapted to act as a stop, limiting the tiltable disposition of the follower 98 by engagement with the inner wall of the spindle base 96. The other member 104 acts as a damper having its depending portion disposed between annular ribs 110 of a damper plate 112 secured to the base member and adapted to retain a viscous fluid within the space bounded by such ribs. A threaded plug 114 is provided within the bottom wall of the damper plate 112 between the ribs 110 to provide means for filling or draining the viscous fluid from such space.

As shown by Figure 13, a pair of linear variable displacement type pickup devices 116 and 118 are provided within the balance station base member 60 and are disposed 90° apart with respect to each other and in radial alignment with the workpiece support spindle 62. Referring to Figure 15, each pickup device includes a core member 120 mounted upon spring reed members 122 and 124 and a field coil member 126 with a housing 127 and axially adjustable about the core member 120 by means of a travel nut 128 and threaded shaft 130 with a reach rod extension 132 to dispose the adjustment control knob 134 at the side of the base member.

The pickup devices 116 and 118 are each connected to the follower member 98 by means of a transfer link 136, as shown by Figure 15, secured to one of the reed members 124 and a connector 138 of a collar member 140 secured to the end of the follower. The disposition of the pickups and their sensitivity to linear displacement provides electrical signals proportionate to the components of unbalance and therefore are together determinative of both the magnitude and angular location of workpiece unbalance.

The balance stations 14 and 16 further include upright stanchions or support columns 142 and 144 secured to the sides of the base member 60 and having a cross brace 146 secured between the upper ends thereof, as best shown by Figure 5. A carriage member 148 is received between the stanchions 142 and 144 and is guided for vertical travel by V-tracks 150 and 152 provided upon the support columns and by guide rollers 154 and 156 provided on each side of the carriage member. The carriage member 148 is raised and lowered by air cylinder means 158 and 160 disposed within the balance station base member 60; the carriage being secured to the piston rods 162 and 164 of such air cylinder means. The weight of the carriage member 148 is counterbalanced by weights 166 disposed within the support columns 142 and 144 and connected by chain means 170 and 172 to the carriage member. The chain means 170 and 172 extend over sprocket pulley means 174 and 176 mounted upon the cross brace member 146.

To assure pure vertical travel of the carriage member 148, regardless of the difference of air pressure within the cylinder means 158 and 160 acting upon the carriage member, mechanical equalizer means, the details of which are most clearly shown by Figure 6, including a pair of rack bars 178 and 180 are secured to the carriage member 148 and have the rack surfaces 182 and 184 thereof engaged by pinion means 186 and 188 mounted upon the cross brace member 146 and connected together for rotation in unison by a shaft 190.

The carriage member 148 includes a balance station conveyor or worktable 192 including parallel rows of roller members 193 forming the workpiece roller transfer means of the balance station. The balance station table 192 is adapted to be lowered from a position aligned with the workpiece loading and unloading table to a position leaving the workpiece 24 supported upon the workpiece receiving spindle 62 which, with the conveyor table 192 lowered, is received and extends between the parallel rows of roller members 193.

The carriage member 148 also includes upright side rails 194 and 196 and a cross member 198 extended between the upper ends of such rails. A marker support spindle housing 204 is provided upon the cross member 198 of the carriage and extends downwardly in axial alignment with the workpiece receiving spindle 62 and supports a marker device 202 adapted for rotation about the axis of the marker support spindle.

Referring for greater detail to Figure 8, the marker support spindle 200 is disposed within a spindle housing 204, secured as by fastening means 206 to the carriage cross member 198 and extended therebelow, and is journaled for rotation within ball bearing members 208 and 210 therein. The marker support spindle 200 extends through the carriage cross member 198 within an angle drive housing 212, shown by Figure 5, and is connected by angle drive means therein (not shown) to a drive shaft 214. A servo motor 216, mounted upon the carriage cross member 198, is connected to the spindle drive shaft 214 through a speed reduction member 218. A circuit control unit 220 is mounted upon the angle drive housing 212 and is adapted to control the angular positioning of the marker support spindle 200 as will be later described.

Referring to Figure 8 once more, marker support means 222 are secured to the marker support spindle 200 by fastening means 224, securing the housing part 226 thereof and retainer part 228 thereof together about the spindle, as shown by Figure 10, and by a snap ring retainer 230, for vertical positioning, and by key means 232 for rotation with the spindle. A sleeve member 234 is rotatably journaled upon the end of the marker support spindle 200 by ball bearing members 236 and 238, separated by a spacer sleeve 240 and retained by the lock washer 242 and nut 244 threaded on the end of the spindle. A gear member 246 is secured by fastening means 248 to the sleeve 234, at one end thereof, and an ink pad retainer 250 is secured to the other end thereof, as by fastening means 252. An ink pad ring 254 is retained on the retainer member 250 by detachable clips 256 and bolt means 258.

Referring to Figures 10 and 11, the housing 226 of the marker support means 222 has mounted therein a motor 260 having a shaft 262. A bevel gear 264 is secured to the motor shaft 262 and engages a bevel gear 266 secured to a rotatable shaft 270 journaled within the housing 226 in ball bearing members 272 and 274. The upper end of shaft 270 is covered by cap 276 secured to the housing by fastening means 278. The lower end extends through the lower wall of the housing 226 and has a gear member 280 pinned thereto as at 282. Gear member 280 engages gear member 246 of the ink pad retainer member for rotating the ink pad 254.

The marker device 202 includes a selsyn torque receiver motor 284 mounted upon the marker support means 222, as by fastening means 286 and enclosed by cover 288, having a rotatable shaft 290 connected to the drive shaft of motor 284, by universal joint means 292, and extending downwardly with a marker wheel 294 secured to the lower end thereof. The marker wheel 294 is peripherally marked with indicia of balance correction; usually in ounce-inch increments of correction.

Figure 9:
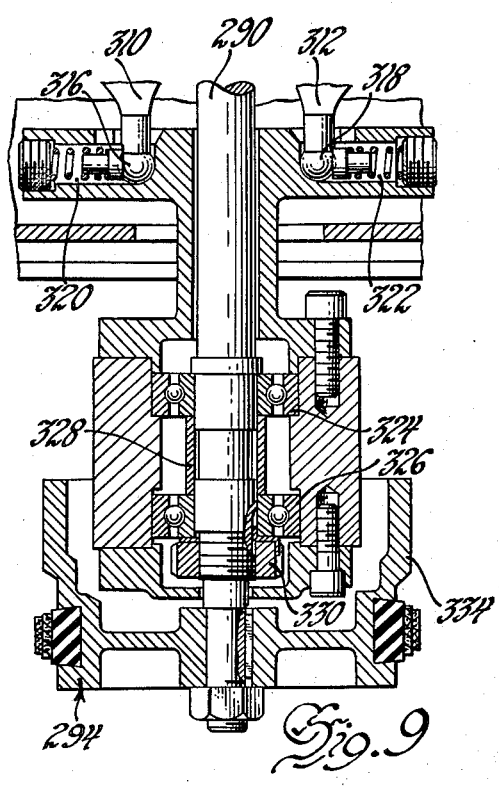
Figure 9 is a cross-sectioned further enlargement of the workpiece marker means of Figure 8.

The marker wheel shaft 290 extends through a marker shift device 296 adapted to shift the marker wheel 294 to engage either the workpiece, when disposed adjacent thereto, or the ink pad 254. The marker shift device 296 includes pairs of electromagnets 298 and 300 having core members 302 and 304 disposed therebetween and secured by universal joint means 306 and 308 to bell crank levers 310 and 312. The bell crank levers 310 and 312 are pivotally mounted to the marker support means 222 and are engaged with a member 314 disposed about the marker spindle 290. The ends of the bell cranks 310 and 312 include ball joints 316 and 318 received within spring loaded sockets 320 and 322 of the housing 314. The housing 314 is supported by, and journaled on, the marker shaft 290 by ball bearing members 324 and 326, positioned by sleeve 328 and fastener means 330 (see Figure 9).

By controlled energization of opposite ones of the electromagnet pairs 298 and 300, the core members 302 and 304 are shifted causing the bell crank levers 310 and 312 to shift housing 314 and consequently marker wheel 294 towards the ink pad 254 or workpiece 24 as desired. A friction ring 332 is provided on the ink pad retainer 250 and, when engaged by the flange 334 of the marker wheel member 294, is adapted to effect rotation of the marker wheel relative to the ink pad 254.

Because of the rotation of the marker support spindle 200, it is necessary to provide slip ring electrical connection means 336 for feeding electrical current to the electromagnets 298 and 300, ink pad rotating motor 260 and marker drive motor 284. Referring to Figure 8 and Figure 16, the marker support spindle housing 204 is relieved, as at 338, and a connection block 340 is disposed therein which includes a plurality of brush members 342. The marker support spindle 200 has secured thereto a plurality of slip rings 344 which are engaged by the brush members 342. Electrical leads (not shown) may be connected to the slip rings 344 and fed through the apertures 346 provided in the hollow support spindle 200 and from there to respective electrical control units.

When the workpieces at each of the balance stations 14 and 16 have been checked for unbalance and marked with the corrective information necessary to obtain balance, the balance station tables 192 are raised to a position in alignment with the worktables 26 and the unloading table 350 of the unloading station. The shuttle bar work transfer means 22 are then adapted to move the workpieces from the balancing stations into the unloading station.

The unloading station 18, in the present instance, comprises a base member 348 and a work or transfer table 350 including a plurality of roller members 20 over which the workpieces may be more easily moved.

In order to pre-position the work members at the end of the loading station 12, and at each of the balancing stations 14 and 16, workpiece stops or positioning means 352 are provided at the end of each balance station worktable 192 which are similar to the stop means 42 of the loading station worktable 26; reference Figures 3, 4, 13 and particularly Figure 14. The stop or positioning means 352 each include an air cylinder 354 for actuating a piston rod 356 having a lever arm 358 connected to the end of the piston rod and keyed as at 360 to a shaft 362 having a stop member 364 secured thereto. The stop member 364 is formed to provide a shoe 366 for engaging the work member 24 and preventing further travel thereof. The stop and positioning means 352 also includes a non-return stop 368 biased by a spring loaded detent 370 to a raised position. The workpiece is adapted to ride over the return stop 368 until engaged by the shoe 366 of the stop member 364, at which time the return stop 368 will be raised by the detent 370 to engage the workpiece member, the rim of the wheel in this instance, to prevent the workpiece from rebounding off from the stop shoe. When the workpieces are to be transferred, the stop members 364 are lowered by their respective air cylinder means 354.

*General description of the balance determinative means*

Figure 17:
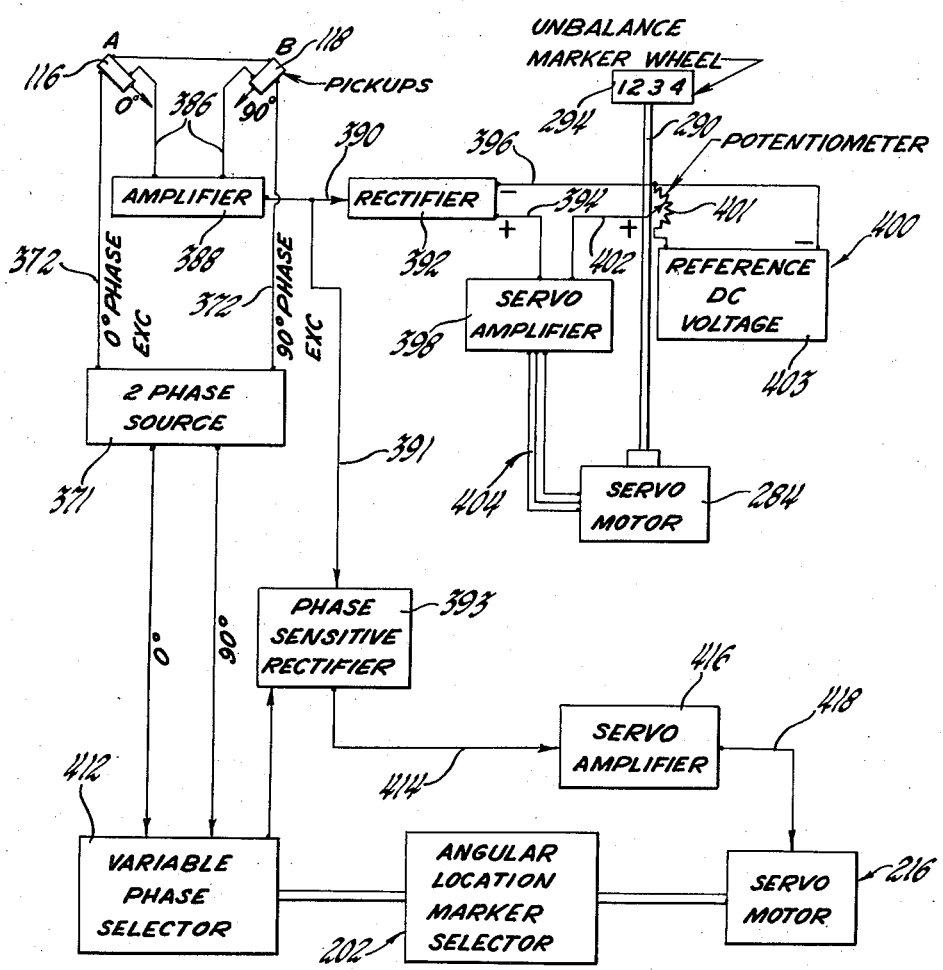
Figure 17 is an electrical schematic representation of the unbalance detection means here employed.

Referring generally to Figure 17, a supply source 371 of two 60 cycle A.C. voltages, phased 90° apart, is applied, as through lines 372, to the linear variable differential transformers or pickup devices 116 and 118.

After the work member is floated on the pivot means at the balancing station, any unbalance in the work member will cause it to tilt with the heavy side down. Tilting of the work member due to unbalance moves the iron core 120 in each of the pickups 116 and 118, located at 90° to each other about the work supporting spindle 62, to cause a voltage variation in each of their respective surrounding coils 126. These electrical signals are proportional to the components of unbalance in line with their respective linear transformers. The output windings of the transformers 116 and 118 are connected in series, as through line 386, thereby vectorially adding the signals to give a composite single voltage signal whose amplitude is proportional to the work member unbalance and whose electrical phase angle is related to the mechanical angular location of the unbalance.

The amplitude of unbalance is derived in the following manner: The composite signal from the pickups is received by an amplifier 388 wherein the signal is amplified, and fed as an A.C. signal through line 390 to the rectifier 392 to give a D.C. voltage proportional to the unbalance detected. The D.C. signal is fed through lines 394 and 396 to the amplitude servo amplifier 398 and the amplitude servo mechanism 400.

The amplitude servo mechanism 400 includes a servo motor 284, a potentiometer 401 located on the shaft 290 and reference D.C. voltage source 403. The signal received from the rectifier 392 at the servo mechanism 400 is passed through the potentiometer 401 and back to the amplitude servo amplifier 398.

The amplitude servo amplifier 398 compares the rectified output signal, received through line 394 from the rectifier 392, with the signal received from the potentiometer 401, as through line 402, giving an error signal which it applies, as through line 404, to the servo motor 284 of the servo mechanism 400. The servo motor 284 drives the tap of potentiometer 401 in a direction to reduce the error voltage to zero by causing the potentiometer or reference voltage tap to assume the same voltage level as the rectified output signal. The angular location of the reference voltage tap will then correspond to the unbalance amplitude and, accordingly, the amplitude marker wheel 294 will be rotated so as to locate the amount of balance correction required in marking position.

When the potentiometer or reference voltage tap has been positioned to assume the same voltage level as the unbalance, the error voltage signal will be nullified and a signal to the effect that amplitude computation is completed may be obtained from the amplitude servo amplifier 398.

The angle of unbalance is determined by comparing the phase relation of the amplitude pickup signal, that is the A.C. signal received through line 391 from the amplitude amplifier 388, in the phase sensitive rectifier 393 with the signal received from a variable phase selector 412 operatively connected into the two-phase power source 371.

The phase sensitive rectifier 393 provides additional amplification and shaping of the output signal from the pickup amplifier 388 and is overdriven to produce a square wave output of almost constant amplitude for a wide range of amplitude input signals. This will rectify the signal from 388 to provide a D.C. phase error signal output which is fed to the phase servo amplifier 416, as through line 414. This error signal will have a polarity indicating a leading or trailing phase angle an will have an amplitude indicating the amount of the angle.

The output of the phase comparison means just mentioned is passed from the phase amplifier 393, through line 414, to the phase servo amplifier 416 for further amplification. The amplified phase error signal is then fed through line 418 to the servo motor 216 which positions the marking device 202 about the marker support spindle 200 to the angle of work member unbalance. The servo motor 216 is also operatively connected to the variable phase selector 412 for varying the resolver output until it matches the unbalance signal and eliminates the error signal. This variable phase selector 412 may be similar to that described by the "Kollsman Special Purpose Motors Catalogue," edition of March 1, 1949, on page E–43, published by Kollsman Instrument Division of Square D Company, Elmhurst, New York or any other suitable variable phase sensitive selector means.

When the marking device 202 has been positioned about its support spindle 200, and the phase error signal of the determinative means is eliminated, the absence of an error signal may be used to signal the completion of unbalance angle determination.

*Sequence of operation*

Automatic controlled operation of the disclosed balancing machine is as follows:

The power driven rollers 20 are continuously driven to feed work members 24 into the balancing stations 16 and 18. With the balancing station tables 192 raised, and work members in place to actuate limit switches 3LS and 4LS of the work transfer relay switch means 44, the entrance stop means 42 is lowered and the valve in air line 66 is opened to form a film of air between the surfaces of the ball member 82 and recess 76. The entrance stop 42 when in its lowered position signals the advance of the shuttle transfer means 22. The transfer means unloads the previously balanced work members and brings the next pair to be balanced into position on the balancer tables 192.

During the work loading operation each marker wheel servomotor 284 is electrically disconnected from the electrical circuit to energize solenoids 298 and 300 (at different balance stations) and bring the marker wheels 294 against their ink pads 254 while the pads are driven as by motors 260. The marker preparation is timed for approximately one revolution of the marker wheel 294.

When the shuttle transfer means 22 has nearly finished its stroke, the entrance stop 44 is raised and the stop means 352 of the balancing stations insures positioning the work members at their proper places. When the transfer means reaches its fully advanced position, the balance station tables 192 are lowered by means of control piston cylinders 158 and 160, shown by Figure 5. When the balance station carriages 148, including tables 192, are fully lowered, the transfer means is returned.

In describing the balancing cycle, since both stations are principally the same the operation of only station 16 will be described.

As the table 192 of the balancing station descends with carriage 148 and the work member 24 is received and centered on the free-floating work receiver 80, a vibration transient occurs which is detected by the pickups 116 and 118 and is transferred to the electronic amplifier 388.

When the balancing table 192 is completely lowered, the work member 24 is freely supported on the air film in the ball-socket on the end of spindle 62, and the marker supporting spindle 200 is disposed in position. The tilt of the work member 24 due to unbalance is registered electronically by the pickups 116 and 118 and is translated into amount and angle signals. The graduated marker wheel 294 is rotated by servomotor 284 in response to the amount signal. Subsequent to the completion of this motion, the angle signal is translated to an error signal which rotates the marker means 202 about its supporting spindle 200 to a "null" position where the error signal disappears.

When a balancing cycle has been initiated, and the amount and angle of unbalance have been determined, solenoid 300 is energized to cause a stamping of the corrective amount on the work member at the proper location for correction.

If the amount of unbalance exceeds the range of the balancing machine, the work member is stamped with a mark indicating that its unbalance is beyond the machine's capacity. A weight may be added to the rejected work member and it may then be passed through the machine again.

When the balancing operation is complete, carriage 148 and table 192 will rise, picking up work member 24, to the level of the unloading conveyor means 350. With the table up, the work transfer operation is started and the shuttle means 22 carries the workpieces to the unload station 18.

The unloading and loading of work members proceeds only when both balance stations 14 and 16 have completed their respective cycles.

Manual balance machine operation requires setting up the machine for manual operation, and then pressing individual operating buttons at each work station as desired. However, the inking of the marker wheel 294 is still done automatically upon the advance of the shuttle transfer means.

We claim:
1. Balancing means including a vertically disposed spindle, a work receiving member disposed upon said spindle, ball and socket means provided between said spindle and said work receiving member for the pivotal support of said work receiving member upon said spindle, means connected to said ball and socket means for providing a film of air separating said work receiving member in free-floating and frictionless tiltable relation apart from said spindle, and balance detecting means engaging said work supporting means for the detection of unbalance characteristics of work members received thereon.

2. Balancing means as provided for by claim 1 including work loading means horizontally disposed over said spindle, said work loading means being formed to receive said spindle therewithin, means operatively connected to said loading means for moving said loading means relative to said spindle for transferring a work member thereto, and means operable by said loading means for activating said air film providing means.

3. Balancing means including a vertically disposed spindle member having a work receiving member supported upon the end thereof, said work receiving member being formed to receive said spindle member therewithin and including a work centering flange spaced from the end of said spindle member, complementary ball and socket pivotal means provided between said spindle and work receiving members and secured thereto and disposed within the shielded protection of said work receiving member, said work receiving member being tiltable upon said spindle to assume a position commensurate with the unbalanced character of the work member received upon the flange thereof, and including air pressure supply means provided through one of said members and operatively engaged with said ball and socket means, said pressure supply means providing an air film between said ball and socket means for separating said work receiving member from said spindle member for frictionless free-floating tiltable movement.

4. Balancing means including a vertically disposed spindle member having a work receiving member supported upon the end thereof, said work receiving member being formed to receive said spindle member therewithin and including a work centering flange spaced from the end of said spindle member, complementary ball and socket pivotal means provided between said spindle and work receiving members and secured thereto and disposed within the shielded protection of said work receiving member, said work receiving member being tiltable upon said spindle to assume a position commensurate with the unbalanced character of a work member received upon the flange thereof, wherein said socket means is provided upon said spindle, and said air pressure means includes a flow passage formed through said spindle and a concave spherical surfaced chamber formed concentrically within said socket means, said chamber being in open communication with said ball means, the pressurized air film therewithin lifting said ball means from said socket means and supporting said work member in free-floating frictionless pivotal relation for balance inspection.

5. Workpiece marking means for marking balance correction required of an unbalanced work member under inspection and which includes a marker housing disposed adjacent a work member to be marked, marker means mounted within said housing and including indicia of unbalance correction thereon, means rotatably and pivotally supporting said marker means within said housing, unbalance determining means operatively connected to said work member, means operatively connected to said marker means and said determining means for rotationally positioning said marker means and disposing the required indicia of unbalance correction adjacent said work member in automatic accordance with the determinations of said determining means, means operatively connected to said marker member for automatically engaging said marker means with a work member disposed adjacent thereto upon the completion of the responsive positioning thereof in accord with the unbalance determination of said determining means, including a marker support spindle centrally disposed with respect to a work member under inspection, said marker housing being rotatably secured to said support spindle, and means operatively connected to said marker housing and said unbalance determinative means for rotatably positioning said housing relative to said work member in automatic accordance with the determination of unbalance location thereof.

6. Workpiece marking means as provided for by claim 5 including rotatable ink pad means provided upon said support spindle adjacent said marker means and having said means for engaging said marker means to said work member also automatically operative to engage said marker means to said ink pad, said last-mentioned means being operative for such last-mentioned purpose other than during the rotational positioning of and marking by said marker means.

7. Balancing means for inspecting work members and marking the correction required thereon, said balancing means comprising means for loading and tiltably supporting a work member for balance inspection, means for determining the unbalance character of a work member from the tiltable disposition assumed thereby, and means for marking the unbalance characteristics of a tiltably supported work member thereon, said work supporting means having work receiving means supported thereon and ball and socket pivotal means provided between said work supporting and receiving means, said work loading means being disposed over said work receiving and supporting means for receiving work members centrally over said last-mentioned means and being formed to receive said last-mentioned means therewithin, means operatively connected to said loading means for moving said loading means relative to said work receiving means and disposing work members thereon for tiltable movement upon said ball and socket means commensurate with the unbalance thereof, means operatively connected to said ball and socket means and said loading means for providing an air film between said ball and socket means for the free-floating frictionless tiltable support of said work member thereon, said unbalance determining means being operatively connected to said work receiving means and automatically responsive to the tiltable disposition assumed by a work member disposed thereon, said marking means including marker support means aligned with said work supporting means and cooperatively connected to said work loading means for disposing said marker support means closely adjacent a work member received by said work supporting means, a marker housing secured to said marker support means and rotatable thereabout, rotatable and pivotally supported marker means provided within said housing and having indicia of unbalance correction provided thereon, means operatively connected between said marking means and said unbalance determining means for rotatably positioning said marker means to dispose the indicia of work member correction required adjacent said work member and for rotatably positioning said marker housing about said marker support means in automatic accordance with the location of a work member unbalance, and means operatively connected to said marking means and said determining means for actuating said marker means to engage said work member upon the responsive positioning of said marker housing and marker means relative to the determination of said determining means.

8. Balancing means comprising spaced work stations adapted to receive a series of work members for balance inspection, automatic means for progressively transferring said work members through each of said work stations, one of said work stations including unbalance determinative means and unbalance marking means, said unbalance determinative means including work supporting means and unbalance detection means, and an instantaneous and automatic operative interconnection between said unbalance determinative means and said marking means for actuating said marking means in accordance with the unbalance detected by said detection means upon the receipt of a work member upon said work supporting means from said transferring means following the first inspection thereof and without rotation of said work members, said marking means disposed in spaced relation to said work supporting means and including, marker support means axially aligned with said work supporting means, a marker member mounted upon and rotatable about said marker support means, said marker member having indicia of unbalance correction provided thereon and being automatically responsive to said unbalance determinative means through said operative interconnection for automatically positioning and marking the required indicia of unbalance correction adjacent said work member and where correction is required to be made thereto.

9. Balancing means comprising spaced work stations adapted to receive a series of work members for balance inspection, automatic means for progressively transferring said work members through each of said work stations, one of said work stations including unbalance determinative means and unbalance marking means, said unbalance determinative means including work supporting means and unbalance detection means, and an instantaneous and automatic operative interconnection between said unbalance determinative means and said marking means for actuating said marking means in accordance with the unbalance detected by said detection means upon the receipt of a work member upon said work supporting means from said transferring means following the first inspection thereof and without rotation of said work members, said one work station including, a work receiving table disposed in spaced relation to said work supporting means and formed to receive said work supporting means therewithin, means for moving said table relative to said work supporting means for transferring a work member thereto and therefrom, said work supporting means receiving said work member from said table in tiltable relation thereon, said marker means being operatively connected to said table for movement therewith relative to said work supporting means for disposing said marker member closely adjacent a work member for engagement therewith and in removed relation with respect to a work member during the transfer of a work member therefrom.

10. Balancing means comprising spaced work stations adapted to receive a series of work members for balance inspection, automatic means for progressively transferring said work members through each of said work stations, one of said work stations including unbalance determinative means and unbalance marking means, said unbalance determinative means including work supporting means and unbalance detection means, and an instantaneous and automatic operative interconnection between said unbalance determinative means and said marking means for actuating said marking means in accordance with the unbalance detected by said detection means upon the receipt of a work member upon said work supporting means from said transferring means following the first inspection thereof and without rotation of said work members, said work supporting means including a vertically disposed spindle having a work receiving member provided thereon, ball and socket pivot means provided between said spindle and said work receiving member, and means connected to said work supporting means for providing an air film within said socket means for disposing said work receiving member in free-flowing frictionless pivotal relation apart from said spindle, said unbalance detecting means operatively engaging said work receiving member for the detection of the unbalanced characteristics of said work member received thereby.

11. Balancing means comprising spaced work stations adapted to receive a series of work members for balance inspection, automatic means for progressively transferring said work members through each of said work stations, one of said work stations including unbalance determinative means and unbalance marking means, said unbalance determinative means including work supporting means and unbalance detection means, and an instantaneous and automatic operative interconnection between said unbalance determinative means and said marking means for actuating said marking means in accordance with the unbalance detected by said detection means upon the receipt of a work member upon said work supporting means from said transferring means following the first inspection thereof and without rotation of said work members, said one work station including, a work receiving table disposed in spaced relation to said work supporting means and formed to receive said work supporting means therewithin, means for moving said table relative to said work supporting means for transferring a work member thereto and therefrom, said work supporting means having a work receiving member provided thereon, ball and socket means provided between said work supporting means and said work receiving member, means connected to said work supporting means for providing an air film within said socket means for disposing said work receiving member in free-floating frictionless pivotal relation apart from said work supporting means.

References Cited in the file of this patent

UNITED STATES PATENTS

| | | |
|---|---|---|
| 2,288,690 | Eddison | July 7, 1942 |
| 2,322,561 | Bevins | June 22, 1943 |
| 2,359,470 | Eddison | Oct. 3, 1944 |
| 2,372,610 | Spase | Mar. 27, 1945 |
| 2,647,456 | Aller et al. | Aug. 4, 1953 |
| 2,748,603 | Wilcox | June 5, 1956 |
| 2,792,725 | Lannen | May 21, 1957 |
| 2,821,858 | King | Feb. 4, 1958 |

UNITED STATES PATENT OFFICE

CERTIFICATE OF CORRECTION

Patent No. 2,898,764                                                            August 11, 1959

Claude J. Kinsey et al.

It is hereby certified that error appears in the printed specification of the above numbered patent requiring correction and that the said Letters Patent should read as corrected below.

Column 12, line 13, for "free-flowing" read -- free-floating --.

Signed and sealed this 23rd day of February 1960.

(SEAL)
Attest:

KARL H. AXLINE

Attesting Officer

ROBERT C. WATSON
Commissioner of Patents